(12) United States Patent
Pacheco Mendez et al.

(10) Patent No.: US 11,526,817 B1
(45) Date of Patent: Dec. 13, 2022

(54) ARTIFICIAL INTELLIGENCE LEARNING ENGINE CONFIGURED TO PREDICT RESOURCE STATES

(71) Applicant: Laytrip Inc., Dover, DE (US)

(72) Inventors: Victor Miguel Pacheco Mendez, Santo Domingo (DO); Michael Glyn Powell, Cobham (GB); Attila Ferenc Prikler, Budapest (HU); Michael Roth, Las Vegas, NV (US)

(73) Assignee: Laytrip Inc., Dover, DE (US)

( * ) Notice: Subject to any disclaimer, the term of this patent is extended or adjusted under 35 U.S.C. 154(b) by 0 days.

(21) Appl. No.: 17/485,157

(22) Filed: Sep. 24, 2021

(51) Int. Cl.
*G06Q 10/02* (2012.01)
*G06Q 30/02* (2012.01)
*G06N 20/20* (2019.01)
*G06K 9/62* (2022.01)

(52) U.S. Cl.
CPC ......... *G06Q 10/025* (2013.01); *G06K 9/6257* (2013.01); *G06N 20/20* (2019.01); *G06Q 30/0206* (2013.01)

(58) Field of Classification Search
CPC ............. G06Q 10/025; G06Q 30/0206; G06K 9/6257; G06N 20/20
USPC .......................................................... 705/6
See application file for complete search history.

(56) References Cited

U.S. PATENT DOCUMENTS

| | | | |
|---|---|---|---|
| 8,140,399 B1 * | 3/2012 | Goel ................. | G06Q 30/0601 705/26.1 |
| 9,519,912 B2 | 12/2016 | Chidlovskii et al. | |
| 10,504,195 B2 | 12/2019 | Sun et al. | |
| 2009/0030741 A1 | 1/2009 | Veitch | |
| 2009/0030746 A1 * | 1/2009 | Etzioni ................. | G06Q 10/02 705/14.69 |
| 2012/0109819 A1 * | 5/2012 | Aidoo .................... | G06Q 40/02 705/40 |
| 2013/0024404 A1 | 1/2013 | Zacharia et al. | |
| 2014/0304204 A1 | 10/2014 | Cameron et al. | |
| 2016/0283869 A1 * | 9/2016 | Williams ........... | G06Q 30/0283 |
| 2017/0061329 A1 | 3/2017 | Kobayashi et al. | |
| 2017/0364837 A1 * | 12/2017 | Tiwari ............... | G06Q 30/0283 |
| 2018/0204111 A1 * | 7/2018 | Zadeh .................. | G06N 3/0436 |
| 2019/0057327 A1 | 2/2019 | Arguello et al. | |
| 2019/0303783 A1 | 10/2019 | Utsumi et al. | |
| 2020/0105392 A1 * | 4/2020 | Karkazis ................ | G16H 50/30 |
| 2020/0286106 A1 * | 9/2020 | Candeli .................. | G06Q 10/04 |

* cited by examiner

*Primary Examiner* — Renae Feacher
(74) *Attorney, Agent, or Firm* — Knobbe, Martens, Olson & Bear LLP

(57) ABSTRACT

An artificial intelligence system is configured to receive over a network a search request for a transportation instrument associated with a first date. Matching scheduled transportation events are identified. Matching scheduled transportation events categorized by a first trained learning engine are presented by a user device. A selection of a first of the matching scheduled transportation events is received from the user device. A second trained learning engine is used to predict a time frame when the first matching scheduled transportation event will be associated with a minimum attribute value. A reservation instruction is transmitted to a remote system to reserve utilization of the first matching scheduled transportation event during the time frame predicted by the second trained learning engine. A user is enabled to utilize the first matching scheduled transportation event for transport.

23 Claims, 18 Drawing Sheets

US 11,526,817 B1

ARTIFICIAL INTELLIGENCE LEARNING ENGINE CONFIGURED TO PREDICT RESOURCE STATES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to learning engines and in particular, to methods and systems for using learning engines to perform predictions.

Description of the Related Art

Resource properties may vary over time. It may be more advantageous to utilize or access such resources at certain times based on such properties. However, conventionally it may be very difficult to predict when such properties are at an optimum state. Thus, conventionally, such resources may be utilized or accessed at too early a time or too late a time to benefit from such optimum state.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An artificial intelligence system is configured to receive over a network a search request for a transportation instrument associated with a first date. Matching scheduled transportation events are identified. Matching scheduled transportation events categorized by a first trained learning engine are presented by a user device. A selection of a first of the matching scheduled transportation events is received from the user device. A second trained learning engine is used to predict a time frame when the first matching scheduled transportation event will be associated with a minimum attribute value. A reservation instruction is transmitted to a remote system to reserve utilization of the first matching scheduled transportation event during the time frame predicted by the second trained learning engine. A user is enabled to utilize the first matching scheduled transportation event for transport.

An aspect of the present disclosure relates to an artificial intelligence system, comprising: a network interface; at least one processing device operable to: receive over a network, via the network interface, from a first device a search request for a transportation event associated with a first date; identify a plurality of matching scheduled transportation events corresponding to the search request; categorize the plurality of matching scheduled transportation events using a first trained learning engine; generate, based at least in part on the categorization by the first learning engine of the plurality of matching scheduled transportation events, respective token provision schedules for the matching scheduled transportation events, comprising: respective token values, and token provision timing; cause the plurality of matching scheduled transportation events categorized by the first trained learning engine to be presented by the first device in association with respective token provision schedules; receive over the network, from the first device, a selection of a first of the plurality of matching scheduled transportation events; use a second trained learning engine to predict a time frame when an attribute associated with the first of the matching scheduled transportation events will have a minimum value; transmit a reservation instruction to a remote system to reserve a use of the first of the matching scheduled transportation events during the time frame predicted by the second trained learning engine; and enable a user to utilize the first of the matching scheduled transportation events for transport.

An aspect of the present disclosure relates to a computerized method, the method comprising: receiving, over a network at a first computer system, from a first device a search request for a transportation event associated with a first date; identifying a plurality of matching scheduled transportation events corresponding to the search request; generating, based at least in part on the plurality of matching scheduled transportation events, respective token provision schedules, comprising: respective token values, and token provision timing; causing the plurality of matching scheduled transportation events to be presented by the first device in association with respective token provision schedules; receiving over the network, from the first device, a selection of a first of the plurality of matching scheduled transportation events; using a first trained learning engine to predict a time frame when the first of the matching scheduled transportation events will have a minimum acquisition value; transmitting a reservation instruction to reserve a use of the first of the matching scheduled transportation events during the time frame predicted by the first trained learning engine; and enabling a user to utilize the first of the matching scheduled transportation events for transport.

An aspect of the present disclosure relates to a non-transitory computer-readable medium comprising instructions that when executed by a processor, cause the computer device to perform operations comprising: receiving from a first device a search request for a transportation event associated with a first date; identifying a plurality of matching scheduled transportation events corresponding to the search request; generating, based at least in part on the plurality of matching scheduled transportation events, respective token provision schedules, comprising: respective token values, and token provision timing; causing the plurality of matching scheduled transportation events to be presented by the first device in association with respective token provision schedules; receiving from the first device a selection of a first of the plurality of matching scheduled transportation events; using a first trained learning engine to predict a time frame when the first of the matching scheduled transportation events will have a minimum acquisition value; transmitting a reservation instruction to reserve a use of the first of the matching scheduled transportation events during the time frame predicted by the first trained learning engine; and enabling a user to utilize the first of the matching scheduled transportation events for transport.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIGS. 4A-4I illustrate example user interfaces.

DETAILED DESCRIPTION

Figure 1A:
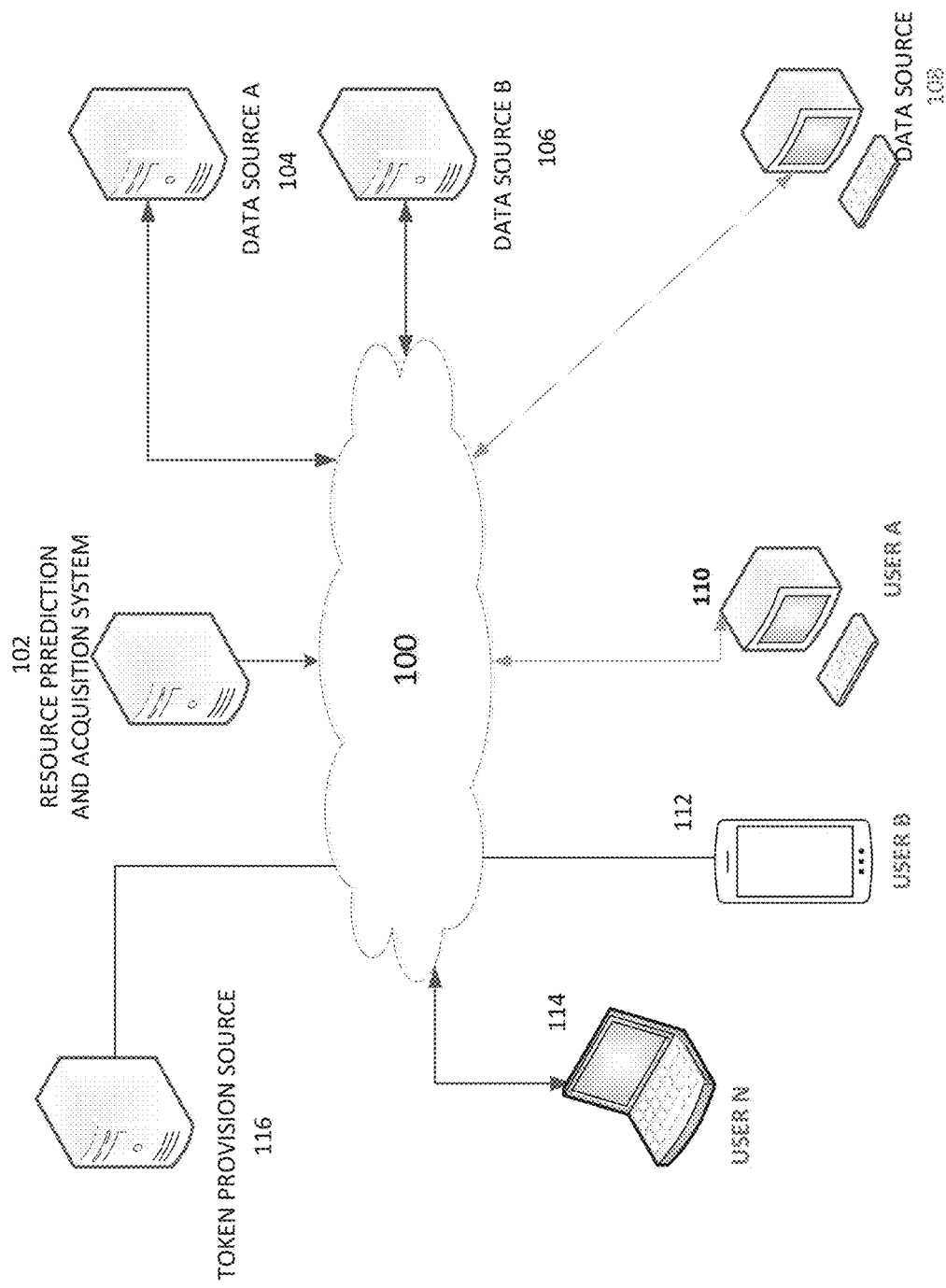
FIG. 1A illustrates an example networked environment architecture.

An aspect of the present disclosure relates to systems and methods for utilizing an artificial intelligence learning engine to predict states of resources and optionally to predict a time period when a selected state will be at an optimum. In addition, methods and systems are disclosed for obtaining a given resource during a time period when a resource is at an optimum state for later utilization. Optionally, as a failsafe, if an event is detected indicating that the prediction may be in error, optionally, the resource may be obtained prior to the predicted time period when the resource property was predicted to be at an optimum state.

Further, an aspect of the present disclosure relates to enabling a user to exchange a first type of resource for a second type of resource, wherein the first resource is received by a system in an incremental manner prior to providing the user with utilization of the second resource. Yet further, an aspect of the present disclosure relates to enabling the user to cancel the exchange.

As similarly discussed above, resource properties may vary over time. It may be more advantageous to utilize or access such resources at certain times based on such properties. However, conventionally because of the large and complex datasets that may relate to such resources and resource states, it may be very difficult to process such data to predict when such properties are at an optimum state. Thus, conventionally, such resources may be utilized or accessed at too early a time or too late a time to benefit from such optimum state.

Described herein are technical solutions to the foregoing technical problems. As will be described, an artificial intelligence learning engine may be trained to predict states of resources, such as a price of an airline ticket on a given route, and optionally to predict a time period when the selected state will be optimum. Further, as will be described, the learning engine may be configured to perform such predictions with high accuracy while reducing the amount of computer resources (e.g., processing power and memory).

Further, such predictions may be utilized to enable a user to acquire, via an intermediary prediction system, certain rights to the resource at a first specified state (e.g., a first token amount, where the token may be state-issued currency, cryptocurrency, credits, loyalty points, etc.) at a substantial period of time prior to the actual acquisition of the resource. The prediction system will attempt to acquire the resource at a lower value than the first specified state. However, even if the prediction system acquires the resource at a higher value than the first state, the user will still only need to provide the first token amount.

For example, the first specified state may be a specified price which the user may need to pay for using tokens (e.g., state-issued currency, cryptocurrency, credits, loyalty points, etc.). However, optionally such tokens may not be required in-full from the user when the user acquires certain rights to the resource. Instead, the user may be enabled to provide the tokens in a time displaced, scheduled manner (optionally interest free), which the total amount of tokens is to be provided by the user prior to the user actually utilizing the resource. For example, if the resource is a plane ticket, the user may provide the total amount of tokens in a certain number of payments (e.g., 4 payments) prior to the flight. Optionally, the user may provide the full token amount when the user books a resource, such as a flight, with the system (rather than on a scheduled payment plan).

As similarly discussed above, optionally even when the user acquires a right to use a resource in a time displaced, scheduled payment manner (e.g., via an installment plan), the interest rate may have a guaranteed interest rate of zero. Thus, in this configuration, the amount charged to a user acquiring a resource on an installment plan and the amount charged to a user acquiring the same resource with a full upfront payment will be the same (e.g., where both users may be charged the same risk markup over the cost of the resource to the system operator). For example, where the resource is an airline ticket, the value of the fare markup may be set to cover the overall predicted average risk of both the installment payment option (where a user may default on making payments) and the upfront payment option. Optionally, in addition to the risk markup, a sales margin profit markup may be added to the amount charged to the user. Advantageously, using this technique, the risk associated with installment payments (which will generally be present) and the associated fare markup is equally distributed to the zero risk, upfront payment transactions. In addition, the user will be presented with the same total price for a resource, regardless of which payment option the user selects, thereby making the presentation less confusing to the user. The risk markup may be adjusted, optionally in real time or periodically, as real-world results are fed into the average risk calculation.

Optionally, the user will not need to provide more than the amount of tokens the user agreed to provide even if when the system eventually acquires the flight ticket that actual amount of tokens for the ticket is higher than the user agreed to provide.

The total amount that the user needs to pay for a resource, such as a ticket, may be based on the current price of the ticket, a predicted price of the ticket (e.g., a price predicted at a certain period of time before the flight or a certain amount of time after the user booked the flight), or an amount based on the current ticket price and a predicted ticket price (e.g., the average of the current ticket price and a predicted ticket price). For example, if a predicted price is less than a current price, the user may advantageously be charged less than the current price for the ticket.

For example, a data science model that incorporates machine learning may be utilized, where the model collects, tracks and analyzes current and recent (e.g., the previous quarter or month or year) historical user travel data points to predict ticket prices for travel routes. The model may be utilized to alert the system when to make the user reservation with a travel provider.

The scheduled payment plan may be generated using a learning engine that categorizes resources, such as flights. For example, as will be described elsewhere herein, flights may be categorized according to a time period between the user booking the flight and the flight departure. For example, optionally the greater the period of time between the booking by the user to the flight departure, the lower the initial deposit. Optionally, the greater the period of time between the booking by the user to the flight departure, the more payments may be scheduled, where the payment amount is lower for a given scheduled payment as compared to where the period of time between the booking by the user to the flight departure is relatively shorter.

Optionally, the system may generate reminders to the user regarding a scheduled payment. Optionally, multichannel reminders may be sent to destinations provided by the user (e.g., email address, SMS/MMS address, phone number, messaging platforms and/or physical addresses).

Optionally, users may provide an instruction or feedback agreeing to have a specified user financial account auto debited for the initial payment and subsequent, scheduled payments. Prior to travel and throughout the scheduled automated payment process duration, users receive many auto notifications regarding their auto payments, prior to, during and after attempted or successful receipt of payment.

Because, optionally, the ticket is not purchased by the system prior to determining that the total amount of the tokens have been received from the user, the risk of the system providing a payment plan is reduced or eliminated. Optionally, the total amount of the tokens may need to be received a threshold number of days prior to the flight.

Optionally, if the user requests a booking change or cancellation, and if the system has not yet purchased the ticket, optionally the entire price or a portion of the purchase price paid by the user may be refunded to the user. If the system has already purchased the ticket for the user, any refund may be contingent on and limited to the refund (if any) provided by the travel provider (e.g., the airline or other carrier) from which the ticket was purchased. Further, with respect to a change in flight by the user, price increases and/or change fees levied by the travel provider may optionally be passed through by the system to the user. If the travel provider cancels the booking, refunds are optionally passed back by the system to the user. Optionally, the system operator may retain a portion of any refund as service fees.

If, after a threshold number of serial reminders, a user on an installment payment plan (e.g., with scheduled payment deadlines to pay respective portions of the total amount due) fails to provide a given installment payment, optionally the system cancels the travel booking. Optionally, a portion or all of the installment payments paid by the user prior to the date of cancellation are retained by the system operator. Optionally, to reduce risk and system inefficiencies the system will not permit a user to book a reservation less than a threshold number of days prior to the corresponding flight date (e.g., 1 day, 15 days, 30 days, 60 days, etc., prior to the flight).

FIG. 1A illustrates an example networked environment that may be utilized to practice the example processes herein. A source selection, prediction and acquisition system 102 (which may be referred to for brevity as the prediction system 102) may be used to enable a user to select and acquire rights in a resource such as a plane ticket, to predict when would be the optimum time (e.g., period of time) to actually acquire the resource, and to acquire the resource at the predicted optimum time.

The prediction system 102 may be coupled, via a network 100 (e.g., the Internet, an intranet, and/or a cellular network) to one or more data sources 104, 106, 108. Data from one or more of the data sources 104, 106, 108 may be used to train a learning engine configured to provide predictions as to when is the optimum time to acquire a resource. In addition, resources may be acquired from operators of certain of the data sources 104, 106, 108. For example, a data source may be a governmental data source, such as the US Department of Transportation booking database with public booking curves. Other data sources may include airline databases (where airplane tickets may also be acquired from the corresponding airline operator). Still other data sources may include travel site databases that may provide data for a plurality of airlines (where airplane tickets may also be acquired from the corresponding travel site operator).

The prediction system 102 may optionally store recent data (e.g., current and the previous quarter or month or year of data regarding future flights, such as current prices, points of origin, destinations, the number of plane changes, the number of stops, etc.) and historical data, blended into a single database to provide a more comprehensive data source that may be more quickly accessed. Optionally, the data in the blended database may be stored in raw form without transformation and information loss (without deleting valid data, without aggregating multiple items of different data into a single value and deleting the different data, etc.). The prediction system 102 may optionally periodically update the blended database and may optionally periodically update the training of the learning engine or use a new learning engine training using the updated blended database.

As described elsewhere herein, the prediction system 102 may optionally be configured to perform market categorization, where market categories may be utilized in determining a payment installment plan for a ticket that may be offered to a user. A market may be a travel leg for an origination location to a destination location.

As also described elsewhere herein, the prediction system 102 may detect when the learning engine price predictions fail to adequately conform with actual prices. In response to detecting that the learning engine price predictions fail to adequately conform with actual prices, the prediction system 102 may purchase a user ticket substantially immediately (e.g., the same day or week) rather than waiting for a predicted optimum time when the learning engine predicts the price will be lowest.

The learning engine may optionally utilize gradient boosting, a machine learning technique for regression and classification problems. Gradient boosting (e.g., XGB=Extreme Gradient Boost) may be configured to produce a prediction model comprising one or more weak prediction models which may optionally be in the form of decision trees (an ensemble of trees) as the base estimator. The final prediction may be based on some or all of the trees. The trees may be classification trees.

A given model may be built in a stage-wise fashion. The models may be generalized by enabling optimization of an arbitrary differentiable loss function. Optionally, the gradient boosting technique may be implemented using the XGBoost implementation, which provides a more regularized model formalization to control and reduce over-fitting, thereby providing improved performance. For example, the maximum size of the trees may be set so as to minimize the risk of overfitting the data. Residuals (the actual value minus the predicted value) from an initial prediction may be used to build an initial tree. Residuals from combining the initial prediction with the first tree as a target value for a second tree. The process may be repeated as many times as needed to reach the specified number of trees or until no further improvement is occurring.

In addition, the prediction system 102 may be configured to generate analytics which may enable the prediction system 102 services to be utilized more efficiently. For example, the prediction system 102 may analyze various key prediction indicators, such as Revenue per Flight (RPF), Revenue per Seat (RPS), Available Seats, Sector Length, and/or Revenue per Available Seat Mile (RASM) to target marketing campaigns with high efficiency and to efficiently select new expansion regions.

The prediction system 102 may communicate with one or more user systems 110, 112, 114 (e.g., smart phones, tablet computers, laptop computers, desktop computers, game consoles, vehicle computers, and/or other computer systems). The user systems 110, 112, 114 may present certain user interfaces described herein. The user interfaces may be presented via a dedicated travel related application downloaded to the user system (e.g., a phone/tablet app downloaded from an application store) or via browser that accesses the user interfaces from a web server associated with the prediction system 102. The user interfaces described herein may enable a user to search for desired flights using a search engine hosted by or accessed via the prediction system 102. The user interfaces enable a user to select desired flight, provide user information (e.g., user name, phone number, email address, government identifiers (e.g., pre-approval security identifiers, driver's license, passport number, etc.) and/or other user data), and initiate a purchase process. As part of the purchase process the user may provide payment information (e.g., specify a token provision source 116 and/or associated account information), agree to a payment plan (e.g., where the user is to provide installment payments according to a specified schedule), and agree to terms of service.

Figure 1B:
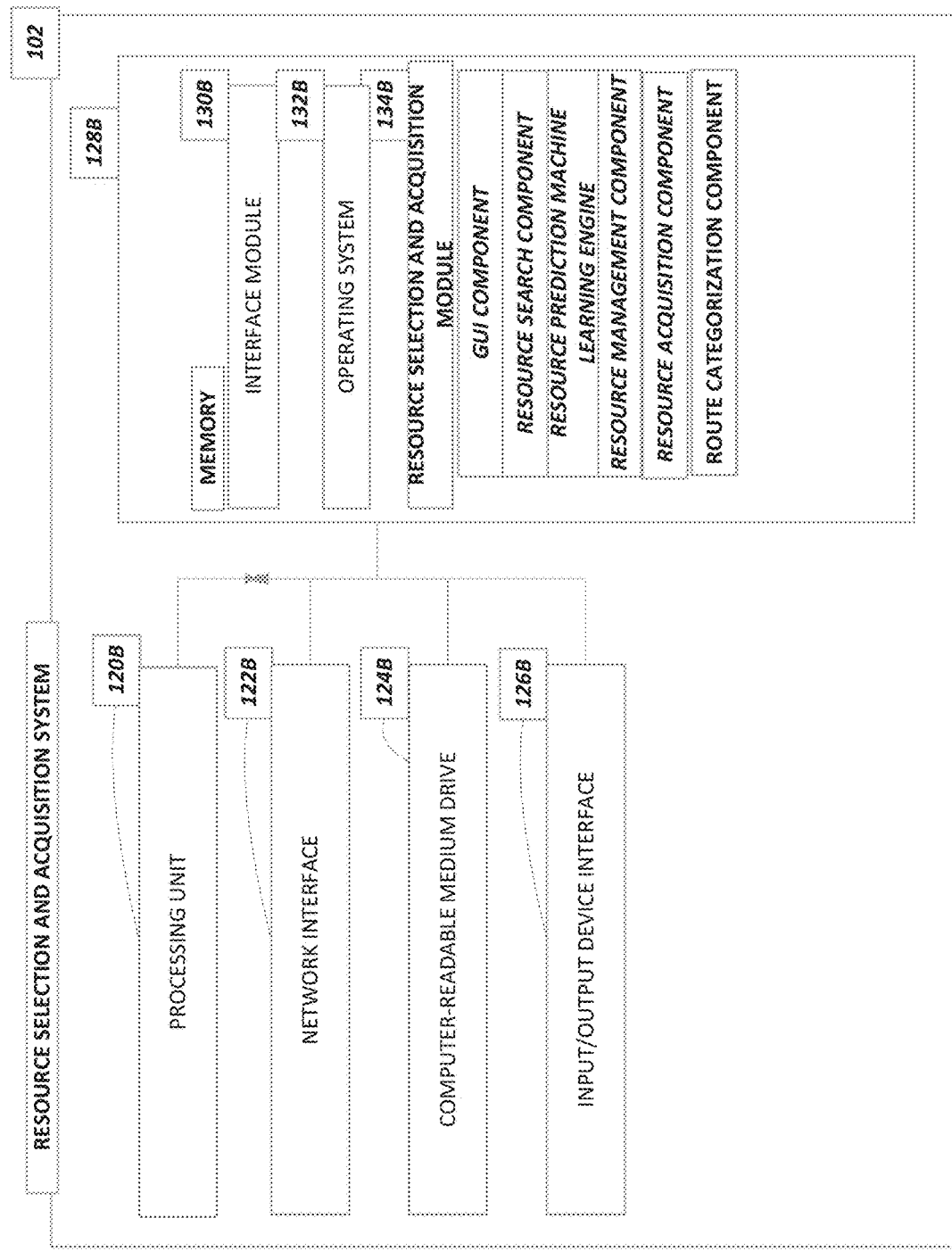
FIG. 1B illustrates an example system architecture.

FIG. 1B is a block diagram illustrating example components of the source selection, prediction and acquisition system 102. The example source selection, prediction and acquisition system 102 includes an arrangement of computer hardware and software components that may be used to implement aspects of the present disclosure. Those skilled in the art will appreciate that the example components may include more (or fewer) components than those depicted in FIG. 1B. Source selection, prediction and acquisition system 102 may comprise a cloud-based computer system.

With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The prediction system 102 may include one or more processing units 120B (e.g., a general purpose process and/or a high speed graphics processor), one or more network interfaces 122B, a non-transitory computer-readable medium drive 124B, and an input/output device interface 126B, all of which may communicate with one another by way of one or more communication buses. The network interface 124B may provide services described herein with connectivity to one or more networks or computing systems.

The processing unit 120B may thus receive information (e.g., historical and current pricing data for various flight legs, flight availability data, etc.) and instructions from other computing devices, systems, or services via a network. The processing unit 120B may also communicate to and from memory 12B4 and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of a resource selection and acquisition module 134B, including it components.

The memory 128B may store user accounts, including contact information, payment instrument data, booked flights, payment plans, payment due dates, and/or other user data described herein. The memory 128 may store images (e.g., still photographs or videos) that were captured by users. The memory 128 may store historical and current flight related data (e.g., identifying carriers, flight routes, flight times, ticket prices, etc.). Some or all of the foregoing data may optionally be stored in a relational database, an SQL database, a NOSQL database, or other database type. Because the assets may include BLOBs (binary large objects), such as videos and large images, which are difficult for conventional database to handle, some (e.g., BLOBs) or all of the assets may be stored in files and corresponding references may be stored in the database. Optionally, the memory 128B may include one or more third party cloud-based storage systems.

The resource selection and acquisition module 134B may include a GUI component that generates graphical user interfaces and processes user inputs, a resource search component, a resource prediction machine learning engine, a resource management component, a resource acquisition component (which include a stop-loss rules engine), and a route categorization component.

The memory 128B may include an interface module 130B. The interface module 130B can be configured to facilitate generating one or more interfaces through which a compatible computing device may send to, or receive from, the resource selection and acquisition module 134B data and content.

Figure 2A:
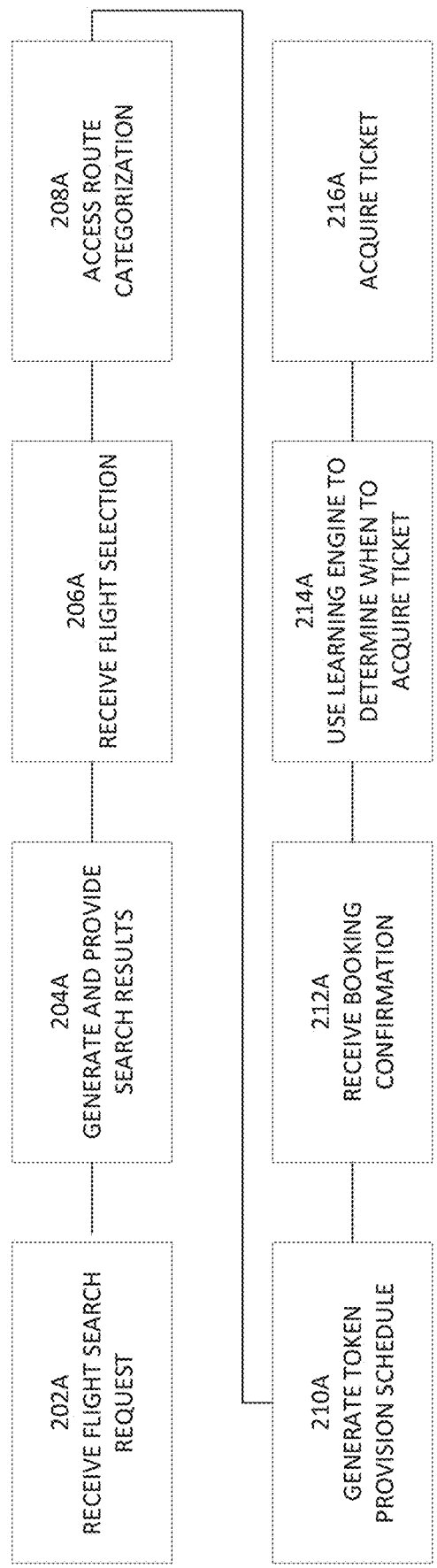
FIGS. 2A-2C illustrate example processes.

Referring to FIG. 2A, an example resource acquisition process which may optionally be executed by prediction system 102. At block 202A, a flight search request is received from a user device over a network at a system (e.g., prediction system 102A). For example, the search request may specify, via corresponding user interface fields, a starting location (e.g., a city or state) and/or a specific starting airport, a destination location (e.g., city or state) or a specific destination airport, a departure date, a preferred departure time or time period (e.g., 8 AM, or "morning"). If the user wants a round trip ticket, the user may specify via corresponding fields, a return date and time. Of course, the user may search for multiple travel legs. The user may also specify whether the user is willing to accept one or more intermediate stops or plane changes. In addition, the user may specify, via a corresponding field, a class of travel (e.g., first class, business class, economy with extended leg room, regular economy, super economy, etc.).

At block 204A, the process conducts a search of one or more flight databases for flights matching the user's query. For example, the process may utilize one or more Application Programming Interfaces (APIs) to access over a network of databases of one or more carriers or travel websites. The process may receive the search results and generate a search result listing which may be transmitted over the network to the user device. At block 206A a user selection of an outbound flight and a return flight (if a return flight is desired) is received via the search results user interface from the user device.

At block 208A, a route categorization generated by a learning engine is accessed. For example, the market categories may be utilized to determine a payment installment plan offered to the user. Markets may be categorized and re-categorized periodically (e.g., daily, weekly, monthly), based on their typical lowest fare day (LFD) prior to flight. For example, the markets may be categorized by the learning engine into three, four, five, six or other number of groups. Optionally, the length of the payment schedule may be inversely related to the closeness of the LFD to the departure date. Thus, optionally the closer the LFD is to the departure date the longer the payment schedule. Optionally, markets that do not fit in the date-relation categories may be categorized in an "other" category. Similarly, optionally a learning engine may be used to categorize hotels for a user, where the categories may be used to determine installment payments for the user.

Following are illustrative examples of market categories:
Category 1 (30): LFD between 0 and 30 days
Category 2 (60): LFD between 31 and 60 days
Category 3 (90): LFD between 61 and 90 days
Category 4 (Other): LFD>90 days.
Category 5 (Unknown): Unknown.

For example, the LFD may optionally be determined for each market using a smoothing and blending algorithm. Smoothing may be used to perform data cleaning to manage factors (one-off events, day of week effect, etc.) that may bias the recent dataset (e.g., the previous month or quarter or year). For example, the smoothing process may calculate a moving day average (e.g., a 3 day, 5 day, 7 day, or 14 day moving average) for the older historical dataset (older than the recent dataset) and the recent dataset by DTG (Days to Go–the number of full days between the data acquisition date and the flight date).

The two smoothed curves (for the recent and historical datasets) are then blended using their respective weighted average. The weights may be determined using the number of data points the historical dataset and the recent dataset respectively contribute to the total blended dataset. For example, if the historical dataset has twice as many data points as the recent dataset, the smoothed historical data curve may be weighted twice as heavily as the smoothed recent data curve.

At block 210A, a token provision schedule (e.g., the payment schedule) is generated based at least in part on what category the requested flights fall into. The token provision schedule may specify the total amount of the ticket price, and the payment dates (which may be auto-debit dates). The token provision schedule is transmitted to the user device for display to the user. The token provision schedule may be presented in association with a confirm control which the user may activate to confirm acceptance of the token provision schedule. At block 212A, a user activation of the confirm control is received and stored.

At block 214A, a trained learning engine is utilized to determine when to acquire the ticket (e.g., when it is estimated that the ticket price will be lowest). As similarly discussed elsewhere herein, a gradient boosting technique may be utilized in making the predictions. If the learning engine does not predict that there will be a lower future price (e.g., where a price trend generated by the learning engine does not have a downward trend), the process may acquire the ticket substantially immediately.

Optionally, as a fail-safe to manage instances where the learning engine predictions appear to diverge from predicted price trends by more than a threshold amount or where ticket price volatility exceeds a certain threshold, the processes disclosed herein may acquire a ticket substantially immediately, without waiting for the predicted date at which the ticket will be at a lowest price. Optionally, to prevent financial loss due to potential divergent pricing events, the ticket prices may be inspected periodically (e.g., at 30 minute, hourly, or daily intervals) and if the price or price change trends appear to diverge from predicted prices or price trends by more than a threshold amount or where ticket price volatility exceeds a certain threshold stop-loss rules are activated. Optionally, both static (price point) and dynamic (price trend, volatility) components are checked and used to determine if stop-loss limits are met or exceeded. If the stop-loss rules are triggered, the travel provider or supplier ticket reservation may be made, and the position closed.

At block 216A the ticket may be acquired (e.g., bindingly reserved) at the predicted lowest price date. Assuming the user makes the payment(s) for the ticket, the ticket will be provided to the user for the flight. The ticket may optionally be delivered to the user device electronically. The user may then use the ticket to take the flight to the destination.

Figure 2B:
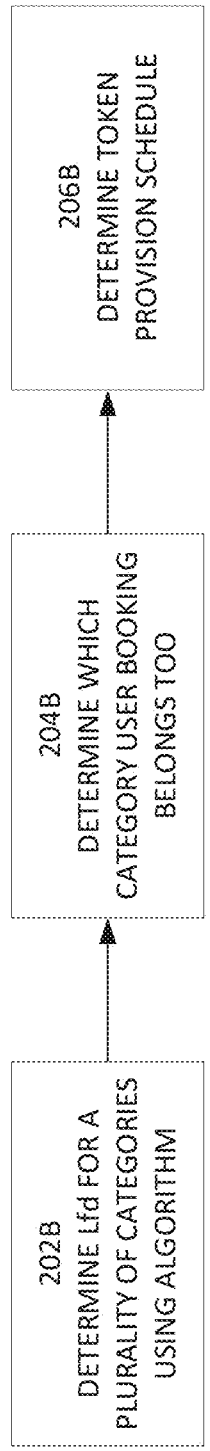

Referring now to FIG. 2B, an example process of determining flight categories, and using those determined categories to determine a token provision schedule. At block 202B, the Lowest Fare Day (LFD) is determined for a plurality of categories using an algorithm. The Lowest Fare Day may be determined using the average DTG (Days to Go–the number of full days between the data acquisition date and the flight date) for a given leg (a directional Origin-Destination (OD) airport pair, e.g., Miami-Cancun (MIA-CUN)) where the lowest fare is expected. As discussed above, the LFD may be determined for each leg/market using a smoothing and blending algorithm.

At block 204B, a determination is made as to which category a user requested flight belongs to For example, using the categories discussed above, if the user's requested flight is 45 days from the time at which the user made the request until the flight, the requested flight would fall into Category 2.

At block 206B, the determined category is used to generate the token provision schedule (e.g., a payment schedule, specifying installment payment amounts and corresponding payment deadlines).

Figure 2C:
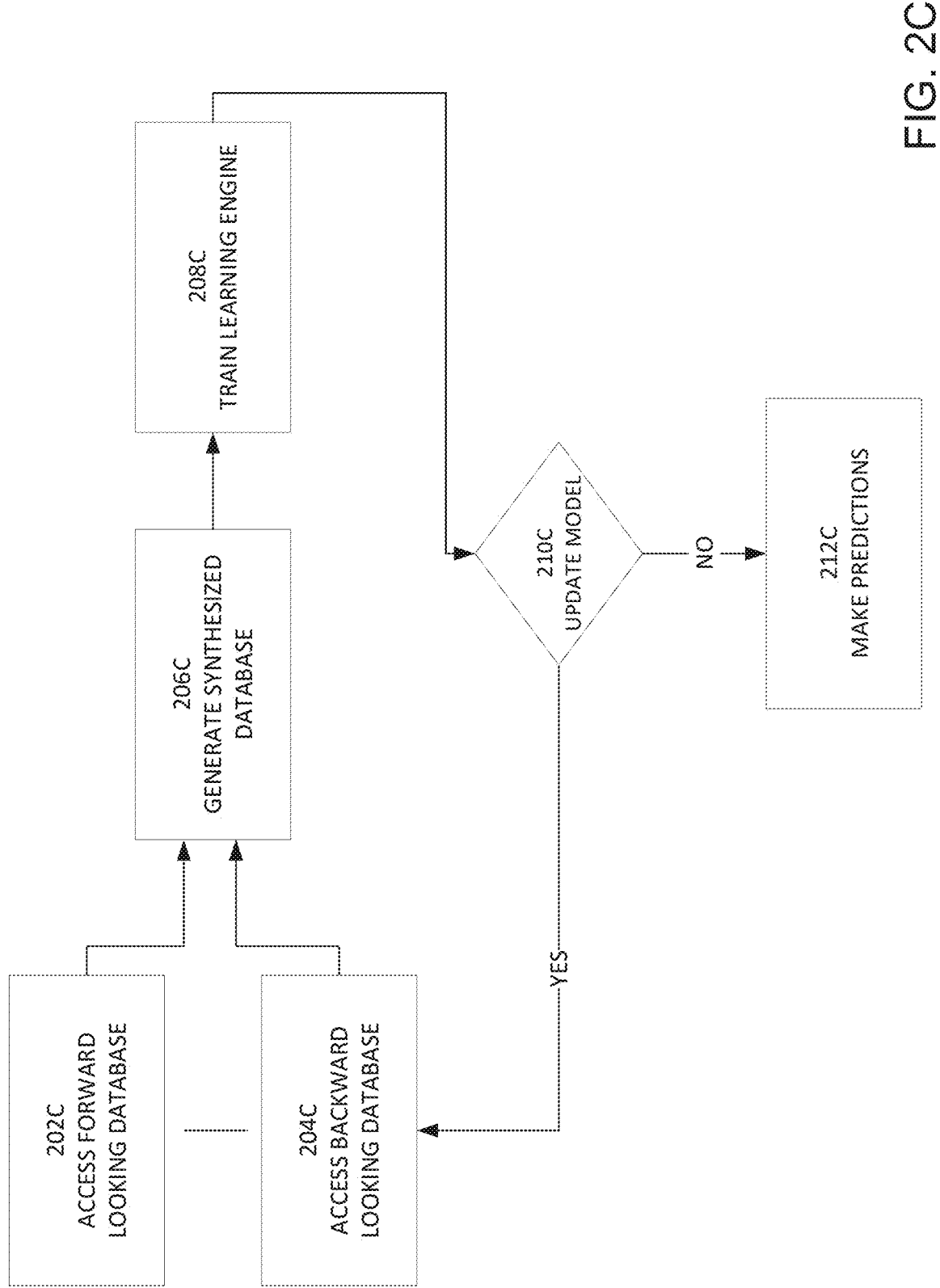

FIG. 2C illustrates an example process for training a learning engine. At block 202C, the process accesses one or more forward looking databases of future flight legs including flight dates, originating airport, destination airport, times, and prices. At block 204C, the process accesses one or more backward looking databases of past flight legs including flight dates, originating airport, destination airport, times, and prices. For example, the backward looking databases may include the US Department of Transportation's DB1B Ticket dollar value booking database and public booking curves. The historical databases may be blended into a synthesized database resulting in an extremely uniquely large dataset (e.g., 5-15 billion records).

At block 206C, the recent and historical data are blended into a common database. The data may optionally be stored in raw form (e.g., without transformation and/or information loss such as might occur via data aggregation or deletion, to enhance data accuracy).

At block 208C, the blended database is used to train one or more learning engines. In order to reduce computer resource utilization (including processor and memory utilization), a given learning engine may optionally be configured to make predictions that may not be specific to a single booking but may be generalized (e.g., month of flight instead of the specific flight date, airline categories instead of airlines, route categories instead of routes, etc.) therefore they are better predictors of the outcome.

At block 210C, a determination may be made as whether the learning engine model is to be updated. For example, one or more update rules may be executed, where the rules specify what triggers a learning engine model update. The rules may specify specific days on which the update is to be performed, a number of days since the last update on which the update is to be performed, and/or that the update is to be performed in response to detecting that the learning engine predictions diverge by more than a threshold amount from the actual price trends.

In response to detecting that the learning engine model is to be updated, the process may proceed back to 202C, 204C, and the learning engine training process may be repeated. Otherwise, the learning engine may continue to make predictions without an update at block 212C.

In addition, to further reduce computer resource utilization and enhance prediction accuracy the learning engine optionally does not predict prices but instead predicts an optimal time or time period to acquire the ticket of the reservation, that is, it predicts for a given user active booking whether there will be a more optimal, lower price at a future date (without predicting the price) or not, and generates a buy or hold recommendation for the corresponding ticket. The foregoing buy/hold analysis may be performed at a desired frequency (e.g., once a day or several times a day).

The unique approach disclosed herein simplifies the prediction problem to a classification and therefore increases the confidence of the model to above 95% as determined by experimentation (an accuracy in the range of 95% to 99%).

Certain user interfaces will now be discussed with reference to the figures. The user interfaces may be rendered on a system 102 terminal (e.g., an administrator computing device) and/or an end user device. For example, FIGS. 3A-3C may be accessible by an administrator and not an end user ticket purchaser, while the other user interface may be rendered on a user device.

Figure 3A:
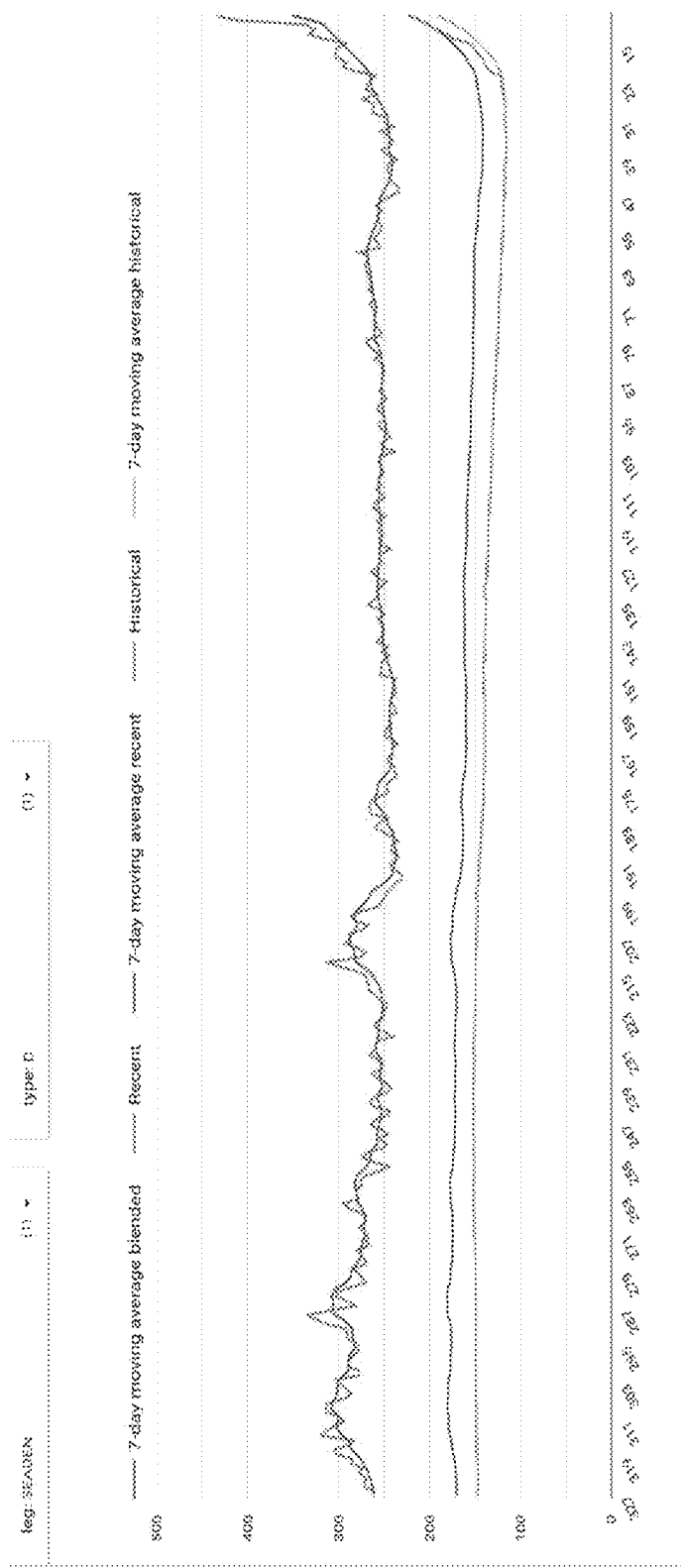
FIGS. 3A-3D illustrate example complex analysis results.

FIG. 3A illustrates accessed and processed pricing data over a period of time for a flight leg. The illustrated user interface enables a user to select a flight leg via a dropdown menu, and a type may be specified via a type dropdown menu. In the illustrated example, pricing curves are provided for recent flights (within a first threshold period of time, such as the last month or quarter), historical flights (older than the recent flights, such as a 12 month period from the oldest of the recent flights), a 7 day moving average for recent flights, a 7 day moving average for historical flights, and a 7 day moving average for a blend of recent and historical flights. In the illustrated example, a year of historical flight data is illustrated, and one quarter (3 months) of recent data is illustrated. Because there is four times as much historical flight data as there is recent historical data, the historical flight data is weighted four times as much as the recent data in generating the blended curve.

Figure 3B:
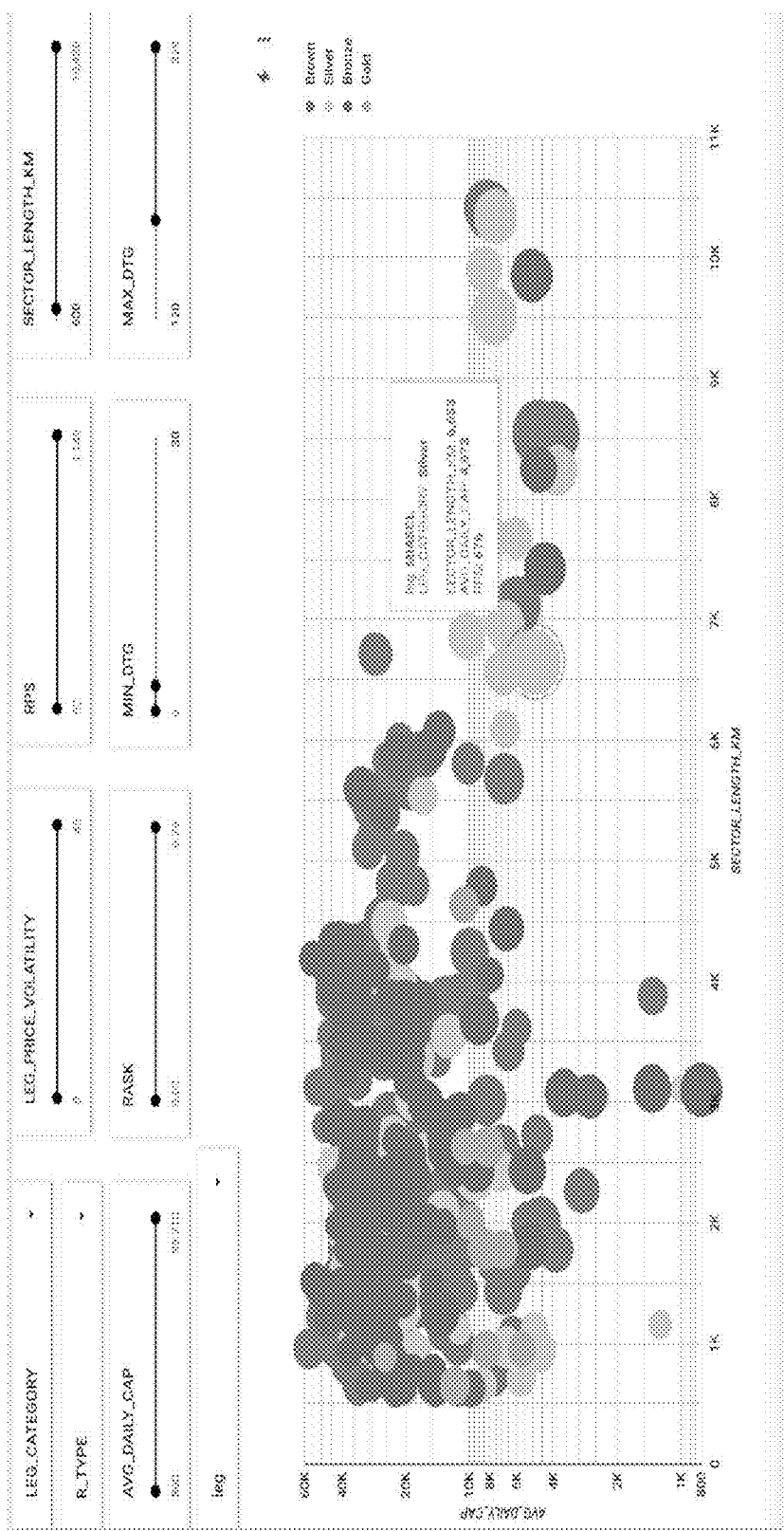

FIG. 3B illustrates an example user interface that provides a graphic illustration of the average revenue per seat by average daily capacity (on the vertical axis) and sector length (on the horizontal axis, in kilometers). User interface filter menus are provided via which a user can set filter conditions, wherein the system will filter the displayed data accordingly. For example, the following user selectable menu filters may be provided: flight leg category, flight leg volatility, Revenue per Seat (RPS), sector length, average daily capacity (CAP), Revenue per Available Seat-Kilometer (RASK), minimum Days To Go (DTG), and maximum Days To Go (DTG). In the illustrated graph, the vertical axis is the average daily CAP, and the horizontal axis is the sector length.

Figure 3C:
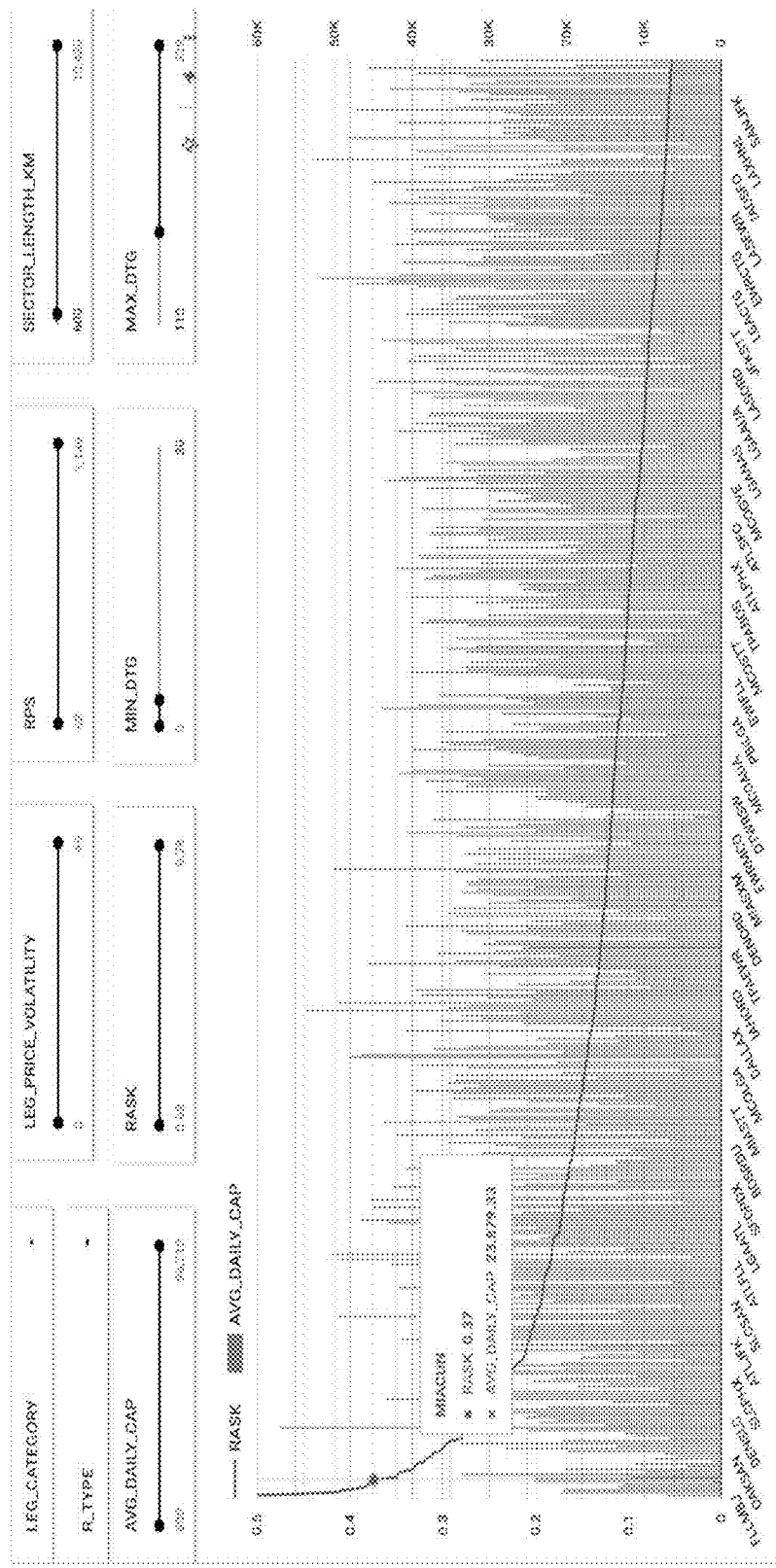

FIG. 3C illustrates an example user interface that provides a graphic illustration of revenue per available seat kilometer (RASK) and average daily capacity (CAP) by market (where the horizontal axis corresponds to markets). The illustrated user interface provides filter menus and filter functionality as similarly discussed with respect to FIG. 3B.

Figure 3D:
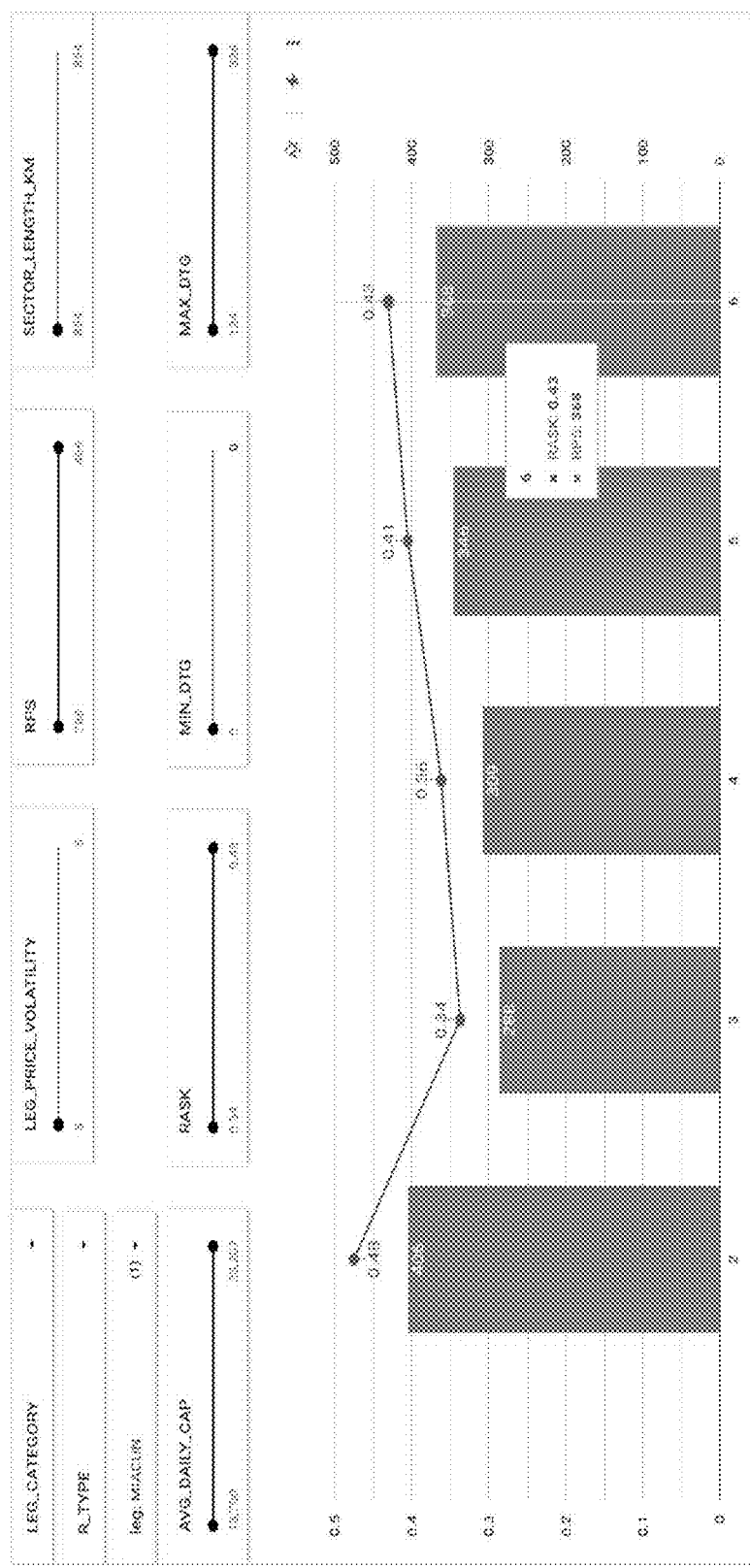

FIG. 3D illustrates an example user interface that provides a graphic illustration of revenue per available seat kilometer (RASK) and revenue per seat by flown month. The illustrated user interface provides filter menus and filter functionality as similarly discussed with respect to FIG. 3B.

Figure 4A:
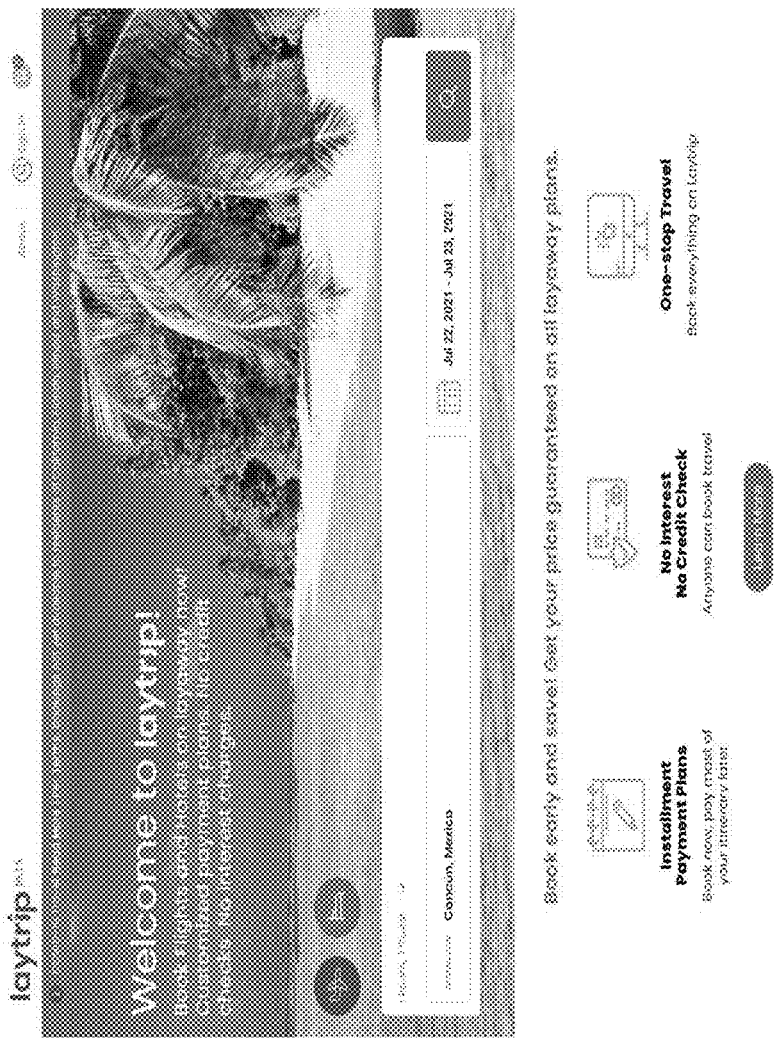
Figure 4B:
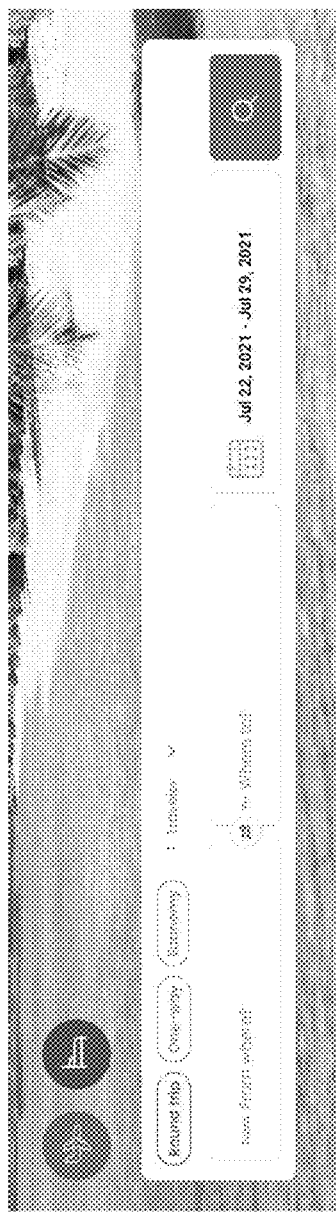
Figure 4C:
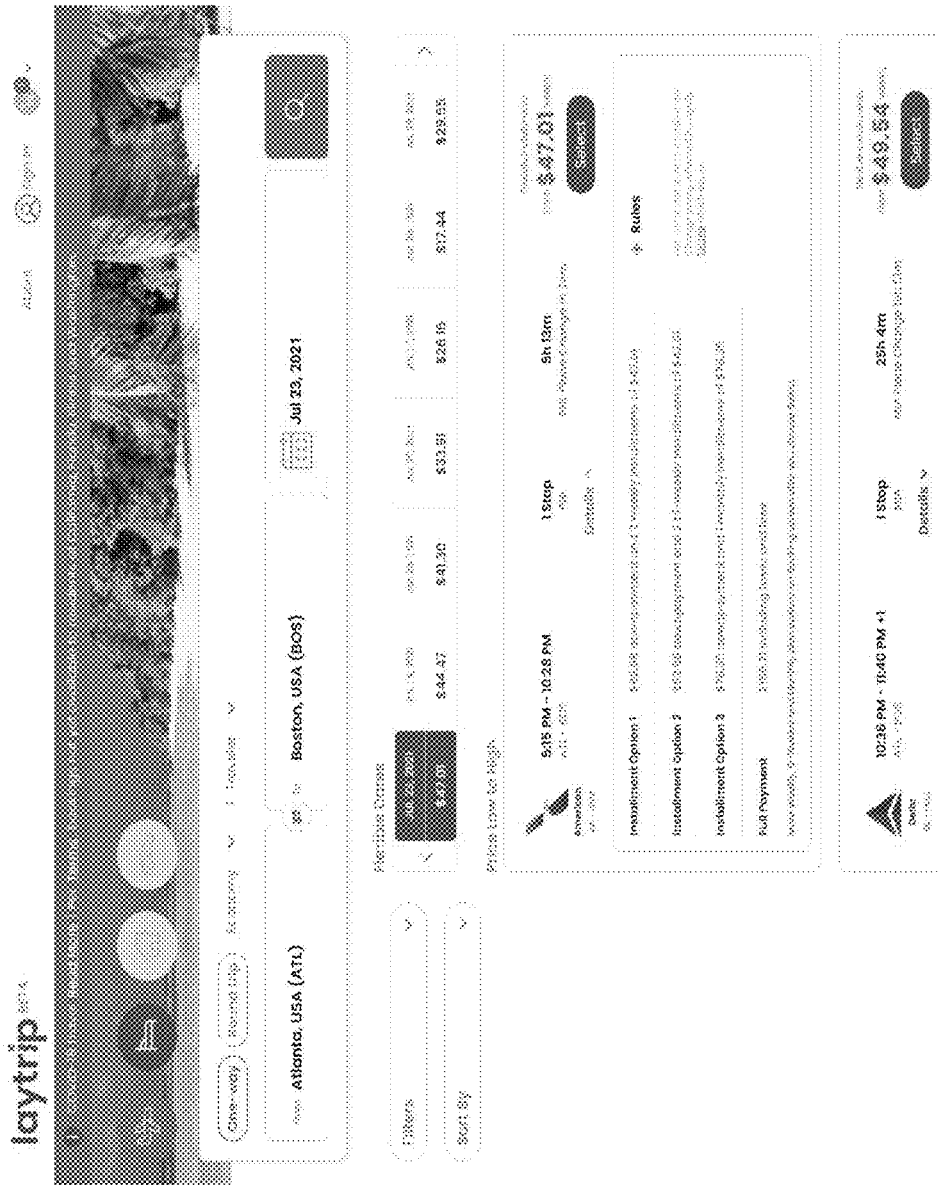

FIGS. 4A-4B illustrates example portions of an end user home page interface. A search field is provided via which the user can enter a search query. Filter controls are provided via which the user can limit the search to hotels, to flights, or both hotels and flights (e.g., a flight and hotel package). Optionally, the search filter may default to hotels or may default to flights. Fields are provided via which the user can specify the number of travelers, specify the traveler type, indicate whether the user wants a one way or roundtrip flights, specify a destination, and specify departure and return dates (e.g., via a calendar user interface). A search control may be provided which when activated will cause the search terms and filters to be provided to a corresponding search engine. A menu is provided via which a user can specify a currency in which prices are to be quoted.

Figure 4D:
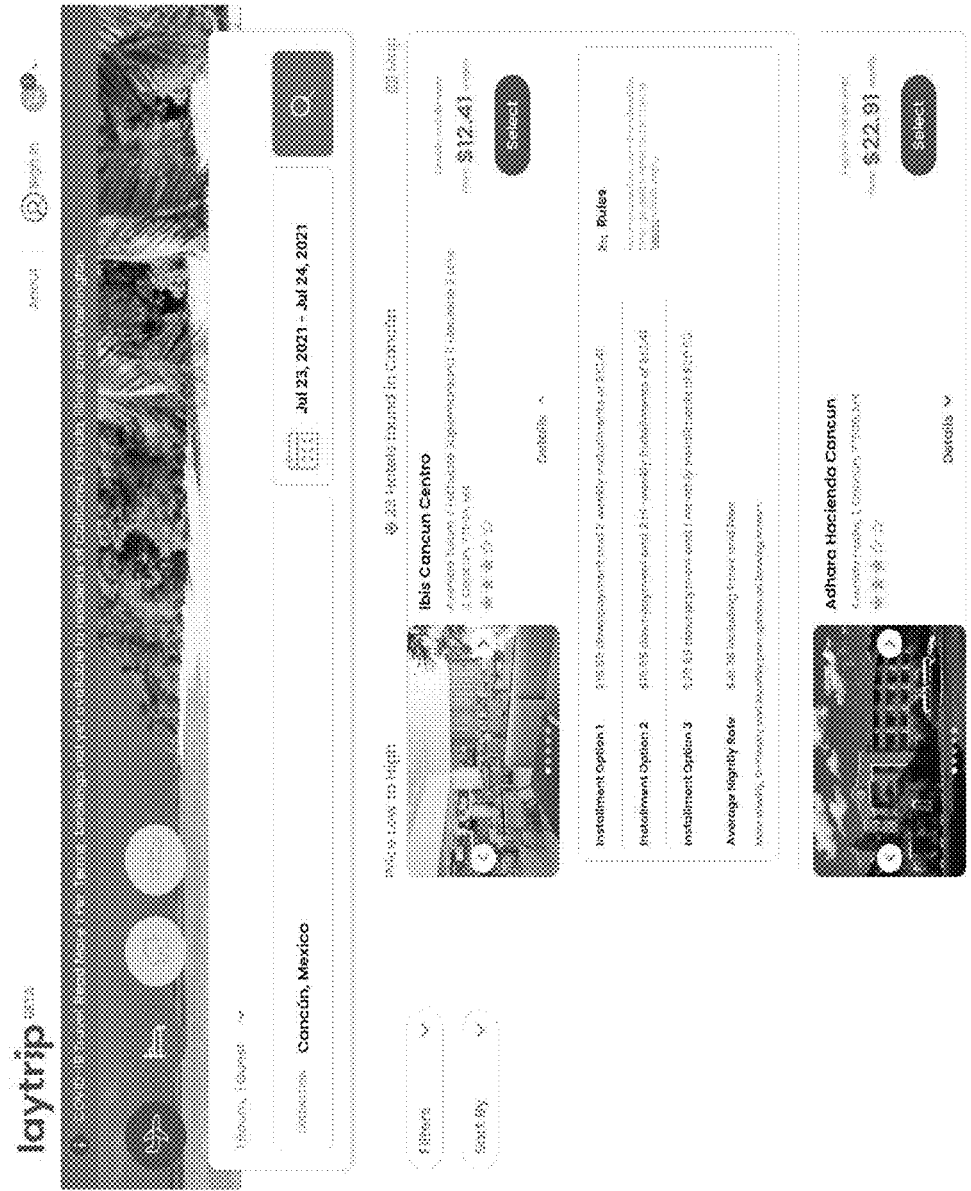

FIG. 4D illustrates an example search result user interface displaying the search engine output generated in response to a user search for flights (e.g., entered via the search fields of FIG. 4A-4B). A given flight option included in the search may be presented in association with one or more installment plan options (which may be generated using a learning engine as described elsewhere herein) and a full price option.

For example, a given installment plan option may specify a corresponding initial payment (e.g., a down payment), payment interval (e.g., weekly, biweekly, monthly), and periodic payment amount. In addition, the flight date, time, departure airport, arrival airport, number of stops, travel time, etc. may be displayed for a given flight. Optionally, a sort control may be provided via which the user can instruct the user interface to sort the flights from ascending to descending price, descending to ascending price, closest match to worse match of requested flight date/time, etc. Optionally, flights for other dates, close in time to the requested date (e.g., +/-1, 2, 3, 4, 5, or other amount of days from the requested date) may be presented in association with the associated periodic payment amount.

FIG. 4D illustrates an example search result user interface displaying the search engine output generated in response to a user search for hotels. A given hotel option included in the search may be presented in association with one or more installment plan options (which may be generated using a learning engine as described elsewhere herein) and a full price option. For example, a given installment plan option may specify a corresponding initial payment (e.g., a down payment), payment interval (e.g., weekly, biweekly, monthly), and periodic payment amount. A given hotel entry in the search results may include one or more photographs of the hotel, the hotel address, and user ratings of the hotel. Optionally, a sort control may be provided via which the user can instruct the user interface to sort the hotels from ascending to descending price, descending to ascending price, highest rated to lowest rated, lowest rated to highest rated, closest to a request location, or further from a request location. A map view control may be provided which when activated may cause the map user interface illustrated in FIG. 4E to be presented.

Figure 4E:

FIG. 4E illustrates an example map user interface. The map user interface graphically depicts the locations of the hotels included in the search results on a map. In addition, a list of some or all of the hotels may be presented with information similar to that discussed above with respect to FIG. 4D, optionally in a smaller format.

Figure 4F:
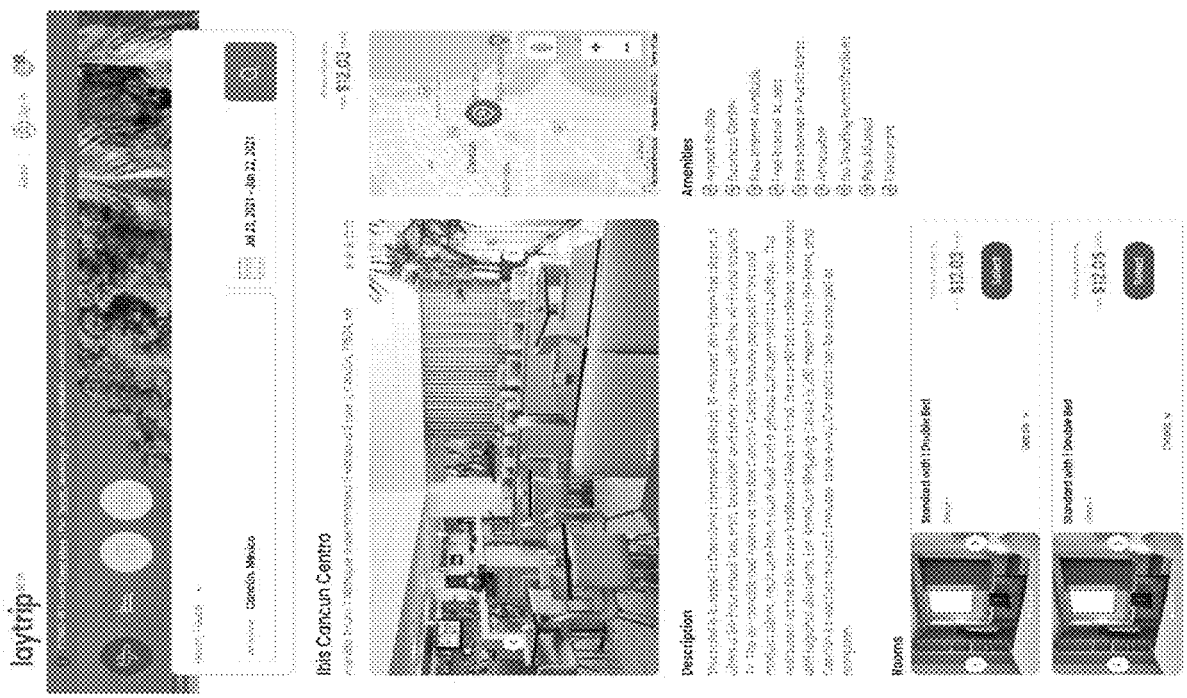

In response to the user selecting a hotel from the search results, the example hotel details user interface illustrated in FIG. 4F may be presented. The hotel details user interface may include photographs of the hotel, a map of the hotel area, a written description of the hotel, and a list of local amenities. In addition, a search may be conducted of available rooms and the search results may be presented in the user interface. A given hotel room entry may include one or more photographs of the room, a room description, and a calculated installment payment (e.g., determined using a learning engine as similarly discussed elsewhere herein).

Figure 4G:
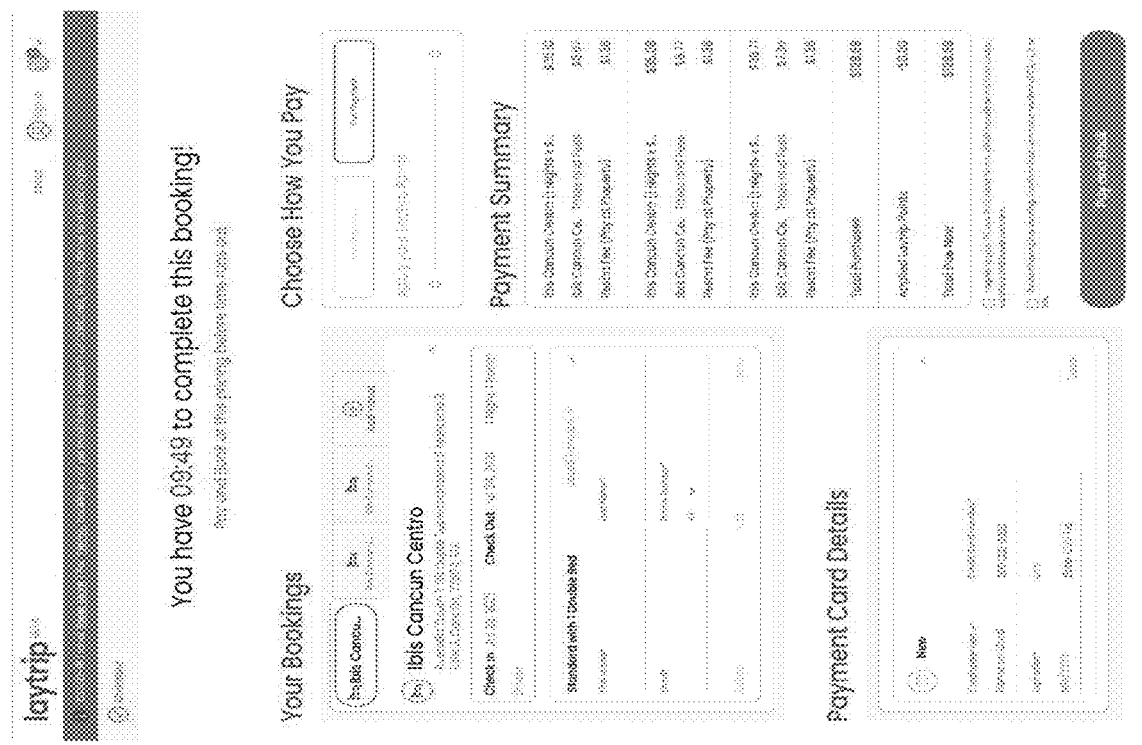

After a user selects either a flight itinerary from a flight search results user interface or a hotel room from a hotel details user interface, the example checkout user interface illustrated in FIG. 4G may be presented. The user interface may provide a summary of the user's flight and/or hotel selections, may delete flights and/or hotels, or may request other hotels and/or flights to add to the user's itinerary. In addition, fields are provided via which the user can enter traveler details (e.g., name, address, email address, phone number, government identifier code, etc.) and payment information (E.g., a credit card number, a debit card number, etc.). Optionally, controls are provided via which the user can select a payment plan from a plurality of installment payment plans or can elect to pay in full. A corresponding payment summary may be generated and displayed to the user (e.g., payments for flights, hotels, resort fees, taxes, other fees, etc.). A control may be provided via which the user can agree to making the purchase, and such purchase may be recorded in a corresponding user booking record.

Figure 4H:
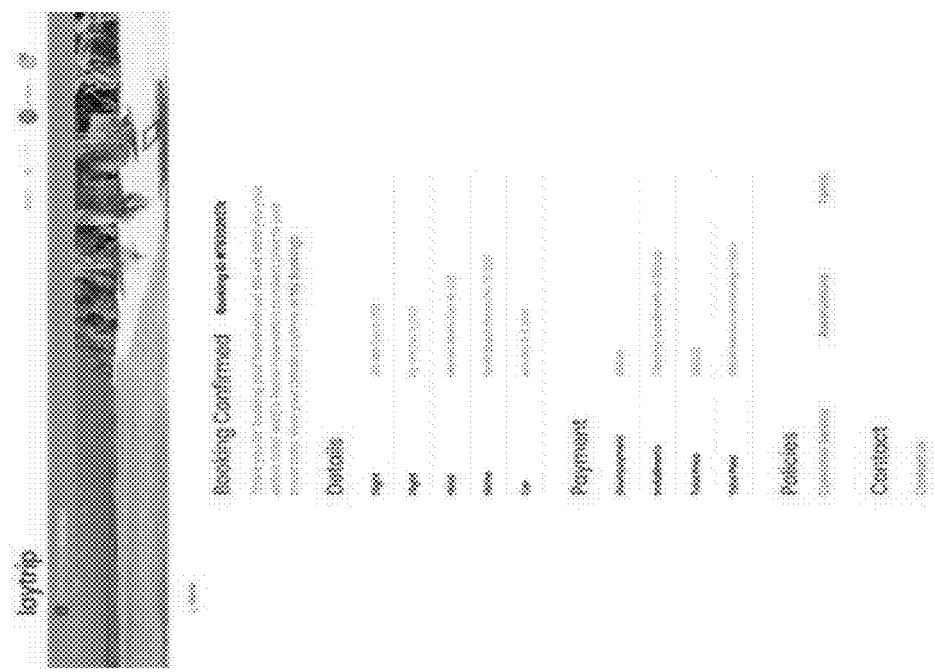
Figure 41:

After the user activates the purchase control, the booking confirmation user interface illustrated in FIG. 4H may be presented. The booking confirmation user interface may be populated with corresponding booking details (e.g., including booked flight information such as flight information discussed elsewhere herein, payment details, such as payment related details discussed elsewhere herein, and policy details).

The system described herein may be configured to automatically deliver notifications to users regarding bookings, payment installments, reservation cancellations, user payment defaults, travel provider reservation information and/or other notifications. FIG. 4I illustrates an example notification related to installment payments. The user interface confirms a recent user payment, including the payment amount, identifies which number of installments the payment corresponds to (e.g., 3 out of 6), the total amount paid to date, the total amount remaining, and the total amount.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An artificial intelligence system, comprising:
   a network interface;
   at least one processing device operable to:
      receive over a network, via the network interface, from a first device a search request for a transportation event associated with a first date;
      identify a plurality of matching scheduled transportation events corresponding to the search request;
      categorize the plurality of matching scheduled transportation events using a first trained learning engine;
      generate, based at least in part on the categorization by the first trained learning engine of the plurality of matching scheduled transportation events, respective token provision schedules for the matching scheduled transportation events, comprising:
         respective token values, and
         token provision timing;
      cause the plurality of matching scheduled transportation events categorized by the first trained learning engine to be presented by the first device in association with the respective token provision schedules;
      generate a synthesized database configured to train a second learning engine to make predictions using:
         data from a forward looking database of future flight legs including flight dates, originating airports, destination airports, and times, and
         data from a backward looking database comprising a ticket value booking database and booking curves, wherein the backward looking database is hosted on a remote system and is accessed over a first network using the network interface;
      train the second learning engine using the synthesized database,
         wherein the second learning engine is trained to make predictions that are generalized for:
            a time period comprising a plurality of days
            airline categories, and/or
            route categories,
         thereby reducing computer resource utilization;
      use the second trained learning engine to predict a time frame when an attribute associated with a first of the matching scheduled transportation events will have a minimum value;

transmit a reservation instruction to the remote system to reserve a use of the first of the matching scheduled transportation events during the time frame predicted by the second trained learning engine; and enable a user to utilize the first of the matching scheduled transportation events for transport, wherein the first trained learning engine, configured to categorize the plurality of matching scheduled transportation events, and/or the second trained learning engine, configured to predict a time frame when an attribute associated with the first of the matching scheduled transportation events will have a minimum value, are configured using gradient boosting to reduce over-fitting, thereby providing improved performance with respect to categorizing scheduled transportation events and/or predicting when an attribute associated with scheduled transportation events will have a minimum value.

2. The artificial intelligence system as defined in claim 1, wherein the matching scheduled transportation events comprise transportation legs having an origin location and a destination location.

3. The artificial intelligence system as defined in claim 1, the system further configured to:

access a first set of historical transportation data for a first historical time period;

access a second set of historical transportation data for a second historical time period;

weight the first set of historical transportation data for the first historical time period using a first weight;

weight the second set of historical transportation data for the second historical time using a second weight;

generate a blended database of blended data comprising the first set of historical transportation data weighted with the first weight and the second set of historical transportation data weighted with the second weight; and use the blended data, comprising the first set of historical transportation data weighted with the first weight and the second set of historical transportation data weighted with the second weight, to train the second trained learning engine.

4. The artificial intelligence system as defined in claim 1, wherein the second trained learning engine, trained to predict the time frame when a given scheduled transportation event will have a minimum value, utilizes gradient boosting comprising a plurality of weak prediction models.

5. The artificial intelligence system as defined in claim 1, the system further configured to:

detect when a given token provision schedule is not complied with; and at least partly in response to detecting that the given token provision schedule is not complied with, cancelling a corresponding reservation for a corresponding transportation event.

6. The artificial intelligence system as defined in claim 1, wherein the second trained learning engine is not configured to predict the value of a minimum acquisition value, and wherein the second trained learning engine has a prediction accuracy in a range of 95%-99% with respect to predicting when a given transportation event will have a minimum attribute value.

7. The artificial intelligence system as defined in claim 1, the system further configured to:

detect that the second trained learning engine predictions fail to satisfy a first prediction accuracy threshold;

at least partly in response to detecting that the second trained learning engine predictions fail to satisfy the first prediction accuracy threshold, transmit at least one reservation instruction to reserve a use of at least one scheduled transportation.

8. A computerized method, the method comprising:

generating, using a computer system comprising a computer device, a synthesized database configured to train a first learning engine to make predictions using:

data from a forward looking database of future flight legs, and data from a backward looking database comprising a ticket value booking database, wherein the backward looking database is hosted on a remote system and is accessed by the computer system over a first network using a network interface;

training the first learning engine using the synthesized database, wherein the first learning engine is trained to make predictions that are generalized for:

a time period comprising a plurality of days airline categories, and/or route categories;

receiving, over a network at a first computer system, from a first device a search request for a transportation event associated with a first date;

identifying a plurality of matching scheduled transportation events corresponding to the search request;

generating, based at least in part on the plurality of matching scheduled transportation events, respective token provision schedules, comprising:

respective token values, and token provision timing;

causing the plurality of matching scheduled transportation events to be presented by the first device in association with the respective token provision schedules;

receiving over the network, from the first device, a selection of a first of the plurality of matching scheduled transportation events;

using the first trained learning engine to predict a time frame when the first of the matching scheduled transportation events will have a minimum acquisition value;

wherein the first trained learning engine, configured to predict the time frame when the first of the matching scheduled transportation events will have the minimum acquisition value, is configured using gradient boosting to reduce over-fitting;

transmitting a reservation instruction to reserve a use of the first of the matching scheduled transportation events during the time frame predicted by the first trained learning engine; and enabling a user to utilize the first of the matching scheduled transportation events for transport.

9. The computerized method as defined in claim 8, wherein the matching scheduled transportation events comprise transportation legs having an origin location and a destination location.

10. The computerized method as defined in claim 8, the method further comprising:

accessing a first set of historical transportation data for a first historical time period;

accessing a second set of historical transportation data for a second historical time period;

weighting the first set of historical transportation data for the first historical time period using a first weight;

weighting the second set of historical transportation data for the second historical time using a second weight;

generating a blended database of blended data comprising the first set of historical transportation data weighted with the first weight and the second set of historical transportation data weighted with the second weight; and using the blended data, comprising the first set of historical transportation data weighted with the first weight and the second set of historical transportation data weighted with the second weight, to train the first trained learning engine.

11. The computerized method as defined in claim 8, wherein the first trained learning engine, trained to predict the time frame when a given scheduled transportation event will have a minimum value, utilizes gradient boosting comprising a plurality of weak prediction models.

12. The computerized method as defined in claim 8, the method further comprising:
detecting when a given token provision schedule is not complied with;
at least partly in response to detecting that the given token provision schedule is not complied with, cancelling a corresponding reservation for a corresponding transportation event.

13. The computerized method as defined in claim 8, wherein the first trained learning engine is not configured to predict the value of the minimum acquisition value.

14. The computerized method as defined in claim 8, the method further comprising:
detecting that the first trained learning engine predictions fail to satisfy a first prediction accuracy threshold; and
at least partly in response to detecting that the first trained learning engine predictions fail to satisfy the first prediction accuracy threshold, transmitting at least one reservation instruction to reserve a use of at least one scheduled transportation.

15. The computerized method as defined in claim 8, the method further comprising:
using a second learning engine to categorize the plurality of matching scheduled transportation events;
generating, based at least in part on the categorization by the second learning engine of the plurality of matching scheduled transportation events, respective token provision schedules for the matching scheduled transportation events.

16. A non-transitory computer-readable medium comprising instructions that when executed by a computer device, cause the computer device to perform operations comprising:
generating a synthesized database configured to train a first learning engine to make predictions using:
data from a forward looking database of future flight legs, and
data from a backward looking database comprising a ticket value booking database, wherein the backward looking database is hosted on a remote system and is accessed over a first network using a network interface;
training the first learning engine using the synthesized database,
wherein the first learning engine is trained to make predictions that are generalized for:
a time period comprising a plurality of days
airline categories, and/or
route categories;
receiving from a first device a search request for a transportation event associated with a first date;

identifying a plurality of matching scheduled transportation events corresponding to the search request;
generating, based at least in part on the plurality of matching scheduled transportation events, respective token provision schedules, comprising:
respective token values, and
token provision timing;
causing the plurality of matching scheduled transportation events to be presented by the first device in association with the respective token provision schedules;
receiving from the first device a selection of a first of the plurality of matching scheduled transportation events;
using a first trained learning engine to predict a time frame when the first of the matching scheduled transportation events will have a minimum acquisition value;
wherein the first trained learning engine, configured to predict the time frame when the first of the matching scheduled transportation events will have the minimum acquisition value, is configured using gradient boosting;
transmitting a reservation instruction to reserve a use of the first of the matching scheduled transportation events during the time frame predicted by the first trained learning engine; and
enabling a user to utilize the first of the matching scheduled transportation events for transport.

17. The non-transitory computer-readable medium as defined in claim 16, wherein the matching scheduled transportation events comprise transportation legs having an origin location and a destination location.

18. The non-transitory computer-readable medium as defined in claim 16, the operations further comprising:
accessing a first set of historical transportation data for a first historical time period;
accessing a second set of historical transportation data for a second historical time period;
weighting the first set of historical transportation data for the first historical time period using a first weight;
weighting the second set of historical transportation data for the second historical time using a second weight;
generating a blended database of blended data comprising the first set of historical transportation data weighted with the first weight and the second set of historical transportation data weighted with the first weight; and
using the blended data, comprising the first set of historical transportation data weighted with the first weight and the second set of historical transportation data weighted with the second weight, to train the first trained learning engine.

19. The non-transitory computer-readable medium as defined in claim 16, wherein the first trained learning engine, trained to predict the time frame when a given scheduled transportation event will have a minimum value, utilizes gradient boosting comprising a plurality of weak prediction models.

20. The non-transitory computer-readable medium as defined in claim 16, the operations further comprising:
detecting when a given token provision schedule is not complied with; and
at least partly in response to detecting that the given token provision schedule is not complied with, cancelling a corresponding reservation of a corresponding transportation event.

21. The non-transitory computer-readable medium as defined in claim 16, wherein the first trained learning engine is not configured to predict the value of the minimum acquisition value.

22. The non-transitory computer-readable medium as defined in claim 16, the operations further comprising:
- detecting that the first trained learning engine predictions fail to satisfy a first prediction accuracy threshold; and
- at least partly in response to detecting that the first trained learning engine predictions fail to satisfy the first prediction accuracy threshold, transmitting at least one reservation instruction to reserve a use of at least one scheduled transportation.

23. The non-transitory computer-readable medium as defined in claim 16, the operations further comprising:
- using a second learning engine to categorize the plurality of matching scheduled transportation events; and
- generating, based at least in part on the categorization by the second learning engine of the plurality of matching scheduled transportation events, respective token provision schedules for the matching scheduled transportation events.

\* \* \* \* \*